(12) United States Patent
Opfergelt (10) Patent No.: US 8,323,108 B1
(45) Date of Patent: Dec. 4, 2012

(54) DOUBLE KICK ADAPTER FOR VIDEO GAME DRUM MACHINE

(76) Inventor: Ronald E. Opfergelt, Bakersfield, CA (US)

( * ) Notice: Subject to any disclaimer, the term of this patent is extended or adjusted under 35 U.S.C. 154(b) by 70 days.

(21) Appl. No.: 12/953,953

(22) Filed: Nov. 24, 2010

Related U.S. Application Data

(60) Provisional application No. 61/263,963, filed on Nov. 24, 2009.

(51) Int. Cl.
*A63F 13/02* (2006.01)

(52) U.S. Cl. .................. 463/36; 463/7; 463/35; 463/47; 84/600; 84/104; 84/422.1

(58) Field of Classification Search ............... 463/36–37
See application file for complete search history.

(56) References Cited

U.S. PATENT DOCUMENTS

| | | | |
|---|---|---|---|
| 4,364,299 | A | 12/1982 | Nakada et al. |
| 4,753,146 | A | 6/1988 | Seiler |
| 5,438,529 | A | 8/1995 | Rosenberg et al. |
| 5,739,457 | A * | 4/1998 | Devecka ........................ 84/743 |
| 6,835,887 | B2 | 12/2004 | Devecka |
| 7,169,998 | B2 | 1/2007 | Kondo et al. |
| 7,320,643 | B1 | 1/2008 | Brosius et al. |
| 7,351,148 | B1 | 4/2008 | Rothschild et al. |
| 2007/0163427 | A1 | 7/2007 | Rigopulos et al. |
| 2009/0258686 | A1* | 10/2009 | McCauley et al. ................ 463/7 |

OTHER PUBLICATIONS

Steradian Technologies, "Twin Rocker", Dec. 24, 2008, <http://web.archive.org/web/20081224015802/http://omegapedal.com/twinrocker/index.html>.*
How to Make Dual Bass Drum Pedals Work in Rock Band. http://imakeprojects.com/Products/rock-band-dual-bass-drums-controller/ Accessed Jan. 7, 2009.

* cited by examiner

*Primary Examiner* — Ronald Laneau
*Assistant Examiner* — Justin Myhr
(74) *Attorney, Agent, or Firm* — Montgomery Patent & Design LLC; Robert C. Montgomery; Joseph Yaksich (57) ABSTRACT

An electronic apparatus that allows for the connection of a pair of bass drum pedals to a single controller further comprises an electronic circuit housed within an enclosure and provided with two (2) input jacks to allow connection of two (2) standard bass drum pedals from the drum controller used in the video game ROCK BAND® (video game). An output cable is then provided for connection to the drum controller. The electronic circuit accepts the switch closure connections from either pedal and uses an array of electronic components to drive a relay which produces a contact closure. This contact closure is then used to feed the controller. The electronic circuit eliminates the collision and cancellation effects associated with simply combining the pedal closures in parallel. In such a manner, a videogame player can generate a greater number of bass drum pedal actuations in a given period of time by using both feet.

14 Claims, 5 Drawing Sheets

B1 = 9 VOLT BATT
C1 = 0.100 MICROFARAD 50 VOLT
C2 = 10 MICROFARAD 16 VOLT
C3 = 10 MICROFARAD 16 VOLT
D1 = IN4739A
D2 = IN4148
D3 = IN4158
D4 = 5 VOLT LED
D5 = IN4001
D6 = IN4001
D7 = IN4001
J1 = JACK 1\8" MONO
J2 = JACK 1\8" MONO
K1 = 5 VOLT RELAY
P1 = AC CORD
P2 = 2 PIN DISCONNECT
P3 = PLUG 1\8" MONO

Q1 = ZN4923
Q2 = ZN3904
R1 = 100 OHMS
R2 = 620 OHMS
R3 = 1000 OHMS
R4 = 10 OHMS
R5 = 4700 OHMS
R6 = 10,000 OHMS
R7 = 10,000 OHMS
R8 = 10,000 OHMS
R9 = 10,000 OHMS
S1 = SWITCH SPST
T1 = XFMR
U1 = DF04M-E3/45
U2 = LM317T
U3 = 7805T
U4 = 74HC86

PARTS LIST

Fig. 5

DOUBLE KICK ADAPTER FOR VIDEO GAME DRUM MACHINE

RELATED APPLICATIONS

The present invention was first described in and claims the benefit of U.S. Provisional Application No. 61/263,963 filed Nov. 24, 2009, the entire disclosures of which are incorporated herein by reference.

FIELD OF THE INVENTION

The present invention relates generally to music video games, and in particular, to an electronic double bass drum pedal adapter for music video games.

BACKGROUND OF THE INVENTION

Home video game systems are more popular than ever. Modern technological advancements in gaming systems have resulted in literally hundreds of games with unprecedented depth and detail. It is in the not-too-distant future that one could envision the home video game system as a standard item in almost every American home in much the same manner as a television or computer is.

As these numbers continue to increase, the market for gaming accessories is growing as well. An example of a recent game which is very popular is the game ROCK BAND® (video game). It uses various controllers to mimic various instruments in a rock band. The drum controller used with this game even has a bass drum foot pedal.

One (1) problem associated with such games is that the bass drum foot pedal controller can only be actuated using a single foot. Many users have attempted to plug multiple pedals into one (1) controller, but due to the configuration of these controllers the signals from one (1) pedal will block out and overlap the signals from the other pedal.

Various attempts have been made to provide music video game controllers. Examples of these attempts can be seen by reference to several U.S. patents. U.S. Pat. No. 6,835,887, issued in the name of Devecka, describes a method and apparatus for providing an interactive musical game including a plurality of electronic drum pads and displays which simulate a live drum setup.

U.S. Pat. No. 7,320,643, issued in the name of Brosius et al., describes a game controller simulating a guitar.

U.S. Pat. No. 7,351,148, issued in the name of Rothschild et al., describes an electronic sequence matching game including a controller with which a user must match timed sequences produced by the game.

While these apparatuses fulfill their respective, particular objectives, each of these references suffer from one (1) or more of the aforementioned disadvantages. Many such apparatuses are not adapted for use with existing music video game controllers. Furthermore, many such apparatuses are unsuited for mimicking a traditional double kick drum pedal assembly commonly found on analog drum sets. Accordingly, there exists a need for a double kick adapter without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for an apparatus adapted for use with an existing music video game system which allows a user to emulate a double kick drum pedal assembly. Thus, the object of the present invention is to solve the aforementioned disadvantages and provide for this need.

To achieve the above objectives, it is an object of the present invention to provide an adapter for the connection of a pair of foot pedals to a single drum controller for a music video game. The apparatus accepts a connection cable from each foot pedal and the drum controller accepts output cable from the apparatus to enable a user to utilize each foot pedal while playing the video game.

Another object of the present invention is to house the electrical and electronic components of the apparatus in a protective enclosure.

Yet still another object of the present invention is to comprise a primary embodiment which allows for adaptation to an existing drum controller.

Yet still another object of the present invention is to comprise an alternate embodiment built into a drum controller as a part of an original equipment manufacturing configuration.

Yet still another object of the present invention is to provide continuous power to the apparatus via connection to a 120-VAC power outlet using a power cord.

Yet still another object of the present invention is to comprise a first signal jack and a second signal jack disposed along an exterior surface of the enclosure which receive a foot pedal output cable from the foot pedals.

Yet still another object of the present invention is to allow simultaneous operation of both foot pedals by producing an instantaneous switch closure at the instant of either switch closure from the foot pedals. This allows the apparatus to emulate the functionality of an analog double bass drum pedal assembly while playing the music video game.

Yet still another object of the present invention is to conserve energy consumption by comprising a battery and a battery power switch which allow the user to selectively operate the apparatus without connection to the power outlet.

Yet still another object of the present invention is to comprise internal circuitry which relays electrical signals from the foot pedals to the drum controller.

Yet still another object of the present invention is to provide a method of utilizing the device that provides a unique means of obtaining an instance of the apparatus, activating the apparatus by plugging in the power cord or operating the apparatus with the internal battery, plugging up to two (2) foot pedals into a respective jack, plugging the output cable into the drum controller, utilizing either foot pedal to perform an action which pertains to the game being played, and simulating a double bass drum pedal assembly.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

| | |
|---|---|
| 10 | dual drum pedal interface for a video gaming system |
| 15 | enclosure |
| 20 | drum controller |
| 25 | foot pedal |
| 27 | foot pedal output cable |
| 30 | power cord (P1) |
| 35 | 120 VAC power outlet |
| 40 | disconnect plug (P2) |
| 45 | first signal jack (J1) |
| 50 | second signal jack (J2) |
| 55 | output cable (P3) |
| 57 | internal battery (B1) |
| 60 | battery power switch (S1) |
| 65 | light-emitting diode (LED) (D4) |
| 70 | transformer (T1) |
| 75 | first integrated circuit (U1) |
| 80 | second integrated circuit (U2) |
| 85 | first transistor (Q1) |
| 90 | third integrated circuit (U3) |
| 95 | fourth integrated circuit (U4) |
| 100 | second transistor (Q2) |
| 105 | mechanical relay (K1) |

DETAILED DESCRIPTION OF THE PREFERRED EMBODIMENT

The best mode for carrying out the invention is presented in terms of its preferred embodiment, herein depicted within FIGS. 1 through 5. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a dual pedal for interface for a video game system (herein described as the "apparatus") 10, which provides an adapter for the connection of a pair of bass drum pedals 25 to a single drum controller 20 in a video game such as ROCK BAND® (video game). The apparatus 10 accepts connection cable 27 from each drum pedal 25 and the drum controller 20 accepts output cable (P3) 55 from said apparatus 10 to enable a player to utilize each said pedal 25 during playing of the video game.

Figure 1:
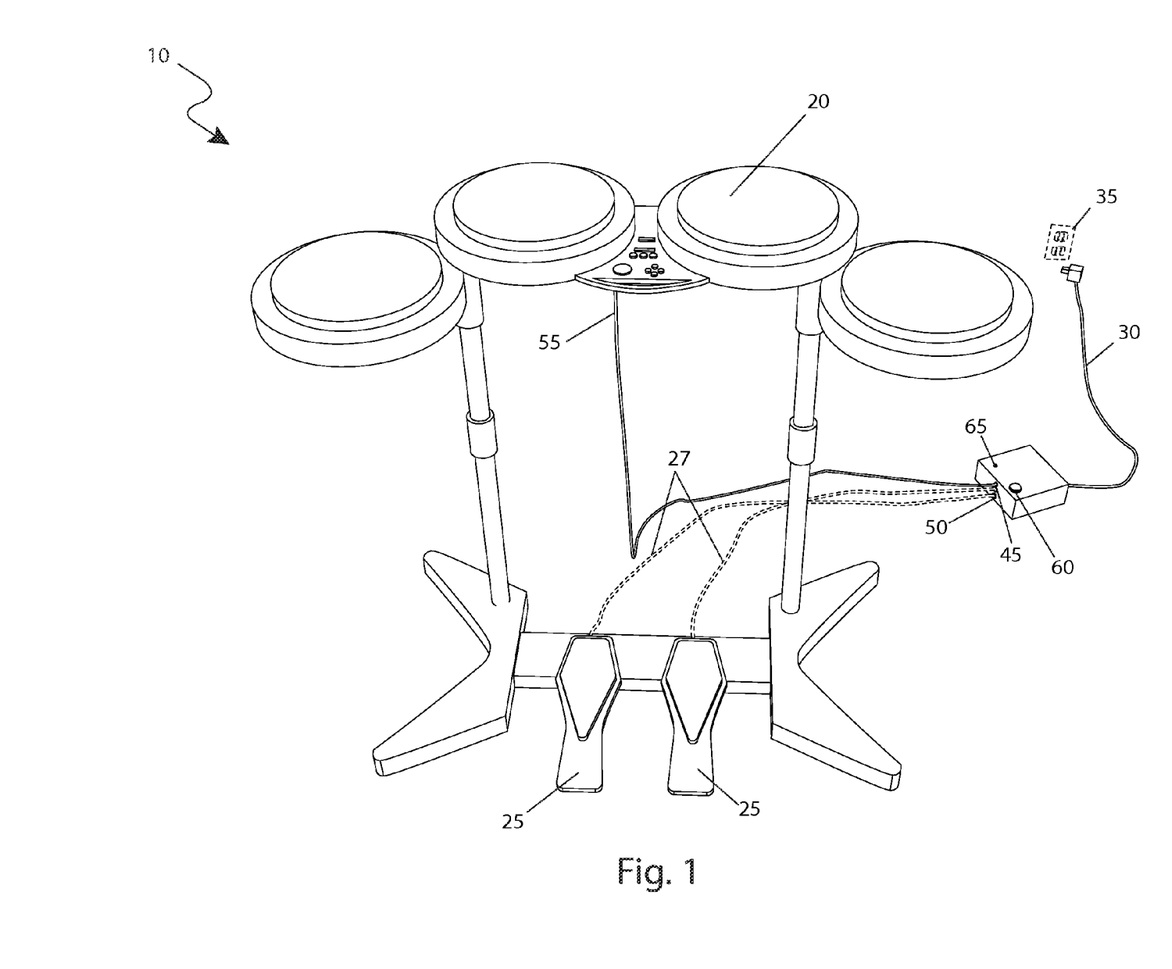
FIG. 1 is an isometric environmental view of a dual drum pedal interface for a video gaming system 10, according to the preferred embodiment of the present invention.

Referring now to FIG. 1, an isometric view of the apparatus 10, according to the preferred embodiment of the present invention, is disclosed. The functional components of the apparatus 10 are provided within an enclosure 15. The overall size of the enclosure 15 is approximately one-and one-half (1½) inches tall, four (4) inches wide and one-and-one-half (1½) inches deep. The enclosure 15 houses the necessary discrete components and associated circuitry to provide the necessary functionality to the apparatus 10. While the present invention depicts the enclosure 15 as a separate device to allow for adaptation to an existing drum controller 20, future versions of the present invention could be built into either the drum controller 20 or one (1) of the two (2) foot pedals 25 as part of an original equipment manufacturing configuration. As such, the enclosure 15 should not be interpreted as a limiting factor of the present invention. A power cord (P1) 30 is used to connect the apparatus 10 to a suitable source of electric power as provided through a 120 VAC power outlet 35 via a disconnect plug (P2) 40. The foot pedals 25 are connected into a first signal jack (J1) 45 and a second signal jack (J2) 50 respectively on the enclosure 15 via their existing foot pedal output cables 27 while an output cable (P3) 55 is used to connect the output signal from the apparatus 10 to the drum controller 20. The apparatus 10 produces an instantaneous switch closure at the instant of either switch closure from the foot pedals 25. The closure immediately opens back up again regardless of whether or not the foot pedals 25 was released. In such a manner the other foot pedal 25 can immediately issue a closure command without waiting for the prior engaged foot pedal 25 to be released. Such a feature eliminates the collision and cancellation effects associated with simply combining the pedal closures in parallel. Thus, a player can generate a greater number of bass drum pedal actuations in a given period of time by using both feet. Additionally, such features add to the excitement of the game and allow for higher scores.

Figure 2:
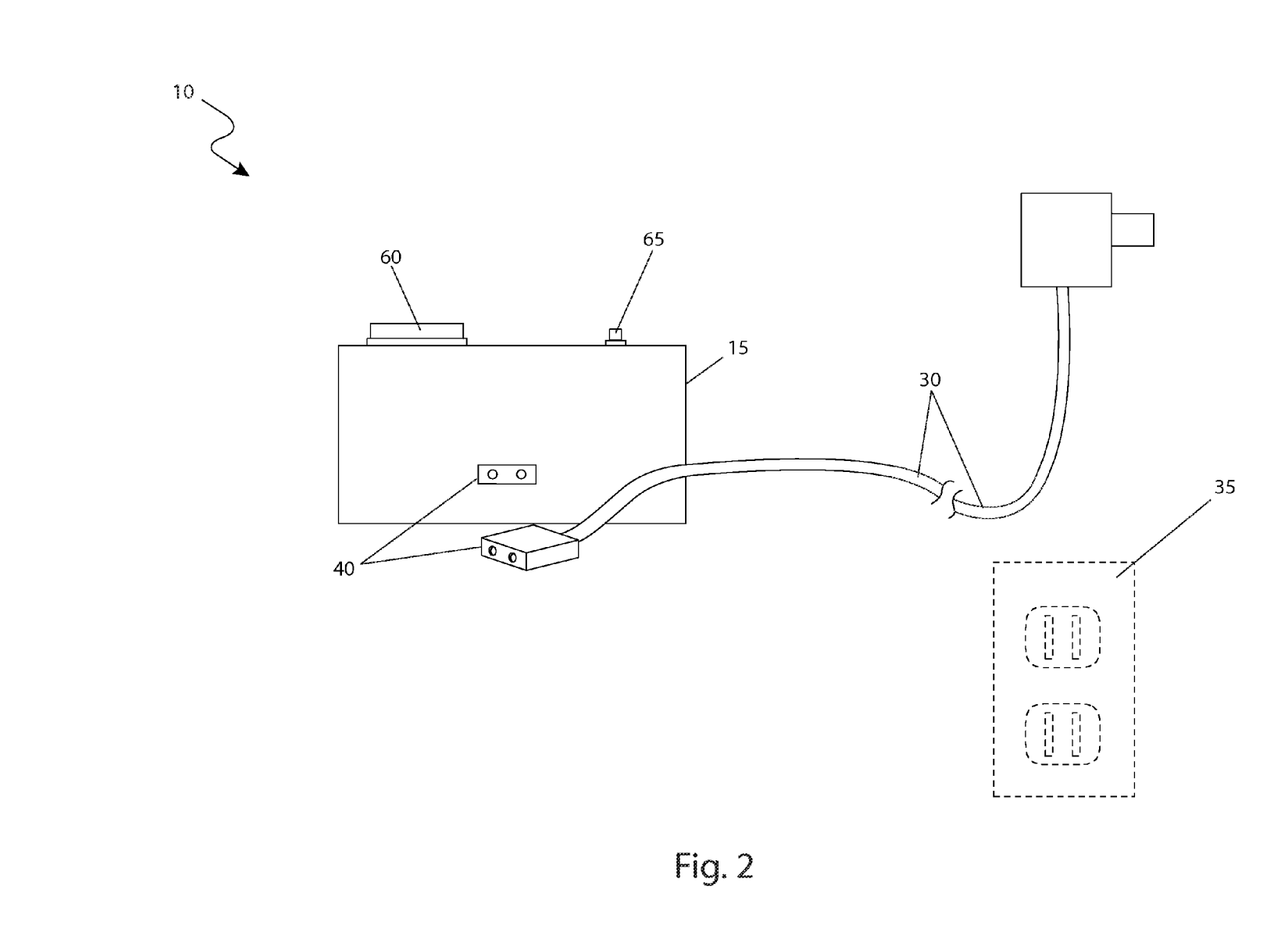
FIG. 2 is an end view of the dual drum pedal interface for a video gaming system 10, according to the preferred embodiment of the present invention.

Referring next to FIG. 2, an end view of the apparatus 10, according to the preferred embodiment of the present invention is depicted. This view more clearly shows the power cord (P1) 30 connected to the enclosure 15 via the disconnect plug (P2) 40. The 120 VAC power outlet 35 allows for the continuous operation of the apparatus 10 without usage of internal battery (B1) 57 (see FIG. 4) thus allowing basically unlimited operational time. Since the operation of the gaming system associated with the drum controller 20 requires the presence of conventional AC electrical power as provided by the 120 VAC power outlet 35, the operation of the apparatus 10 is aligned in the same manner. The internal battery (B1) 57 is disconnected from the circuit via a top mounted battery power switch (S1) 60. Thus for operation via a 120 VAC power outlet 35 (as seen in FIG. 1), the battery power switch (S1) 60 is left in an off state and the operation of the apparatus 10 is controlled by simply plugging the power cord (P1) 30 in and out of the 120 VAC power outlet 35. It can be left plugged in at all times due to the low power consumption of the apparatus 10. To operate the apparatus 10 on its internal battery (B1), the apparatus 10 is left unplugged from the 120 VAC power outlet 35, and the battery power switch (S1) 60 turned on. It is turned off when utilization of the apparatus 10 is complete to conserve battery power.

Figure 3:
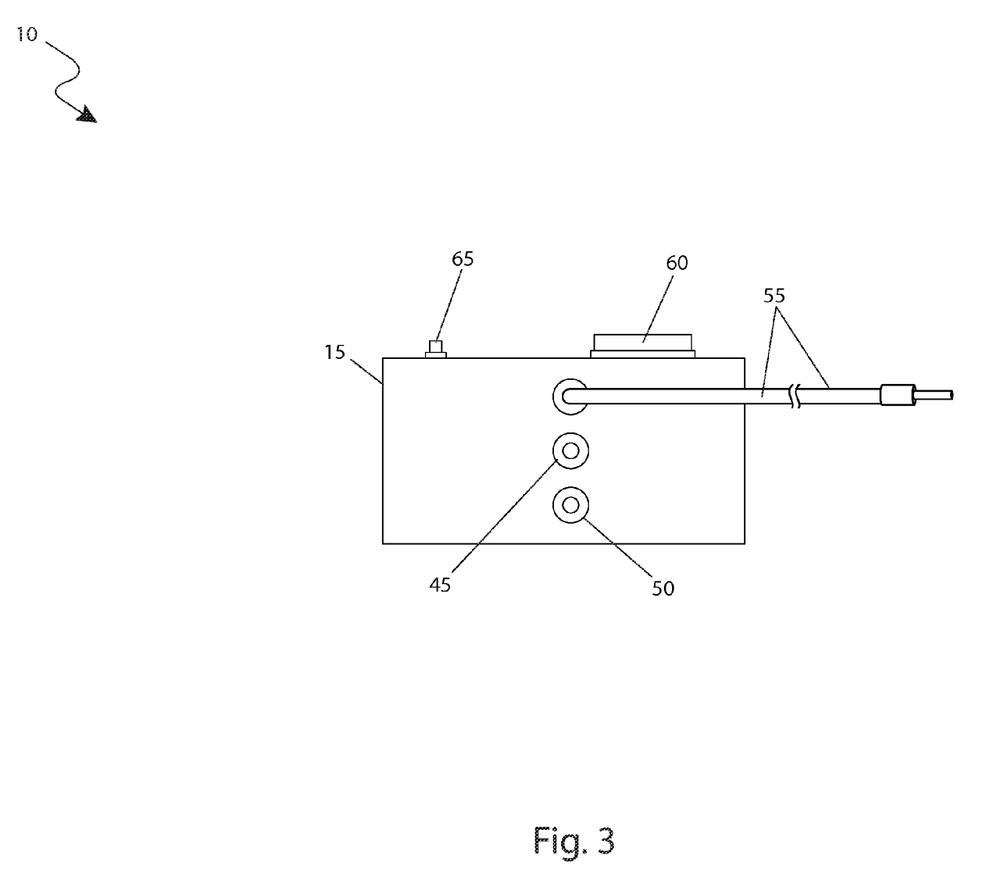
FIG. 3 is an opposite end view of the dual drum pedal interface for a video gaming system 10, according to the preferred embodiment of the present invention.

Referring now, to FIG. 3, an opposite end view of the apparatus 10, according to the preferred embodiment of the present invention is shown. This figure more clearly depicts the first signal jack (J1) 45 and the second signal jack (J2) 50 located on the face of the enclosure 15 along with the output cable (P3) 55 leaving the enclosure 15. The first signal jack (J1) 45 and the second signal jack (J2) 50 are comprised of a standard eighth-inch (⅛) mono plug design such that it can connect to standard foot pedals 25 and standard drum controller 20 without customization. The battery power switch (S1) 60 is also visible on the top of the enclosure 15. Also visible is a light-emitting diode (LED) (D4) 65 to indicate operation of the apparatus 10 and help alert the player to turn off said apparatus 10 when utilization is no longer needed.

Figure 4:
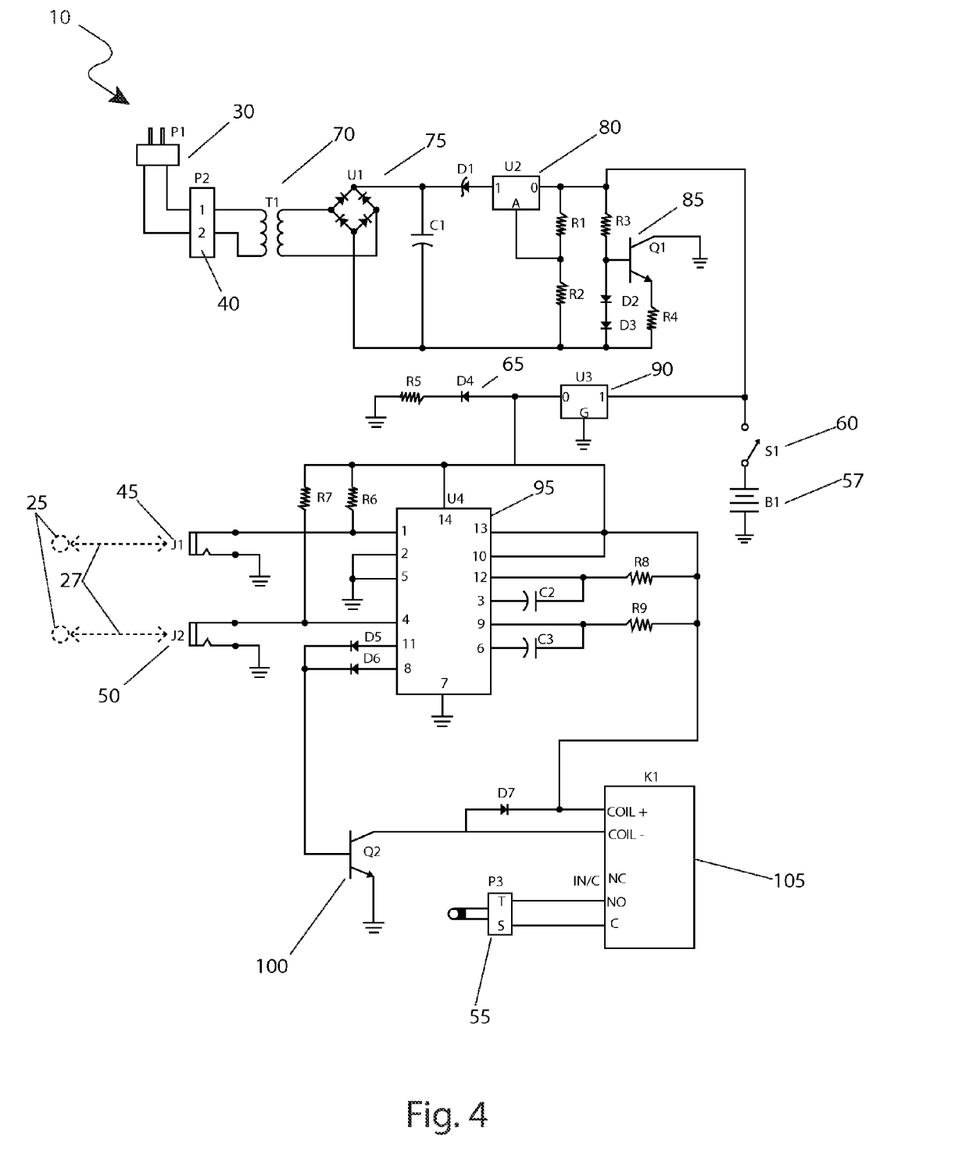
FIG. 4 is an electrical schematic diagram of the dual drum pedal interface for a video gaming system 10, according to the preferred embodiment of the present invention; and, FIG. 5 is a chart depicting the parts list of the electronic components as used with the dual drum pedal interface for a video gaming system 10, according to the preferred embodiment of the present invention.

Referring next to FIG. 4, an electrical schematic diagram of the apparatus 10, according to the preferred embodiment of the present invention is disclosed. Electrical power is introduced to the apparatus 10 via the power cord (P1) 30 and the disconnect plug (P2) 40 as shown into a transformer (T1) 70. The resultant AC power is converted to DC by a first integrated circuit (U1) 75. Further regulation and filtering of the power is provided by a second integrated circuit (U2) 80 and a first transistor (Q1) 85. This resultant power is then sent to a third integrated circuit (U3) 90 which is also supplied power via the internal battery (B1) 57 through the battery power switch (S1) 60. The resultant power from the third integrated circuit (U3) 90 is then delivered to the light-emitting diode (LED) (D4) 65 to indicate operation as well as to a fourth integrated circuit (U4) 95. The first signal jack (J1) 45 and the second signal jack (J2) 50 provide trigger inputs to the fourth integrated circuit (U4) 95. Various values of related circuit components control the time duration and cycle times. The resultant output is then directed through a second transistor (Q2) 100 which drives the coil of a mechanical relay (K1) 105. The output contacts of the mechanical relay (K1) 105 are then directed through the output cable (P3) 55 which are used to trigger the drum controller 20 (as shown in FIG. 1). Said description is an overview of circuit operation. Other components not described serve related functions associated with the above description and will be readily discernable to those skilled in the art. Further description of all circuit components will be provided herein below.

Figure 5:
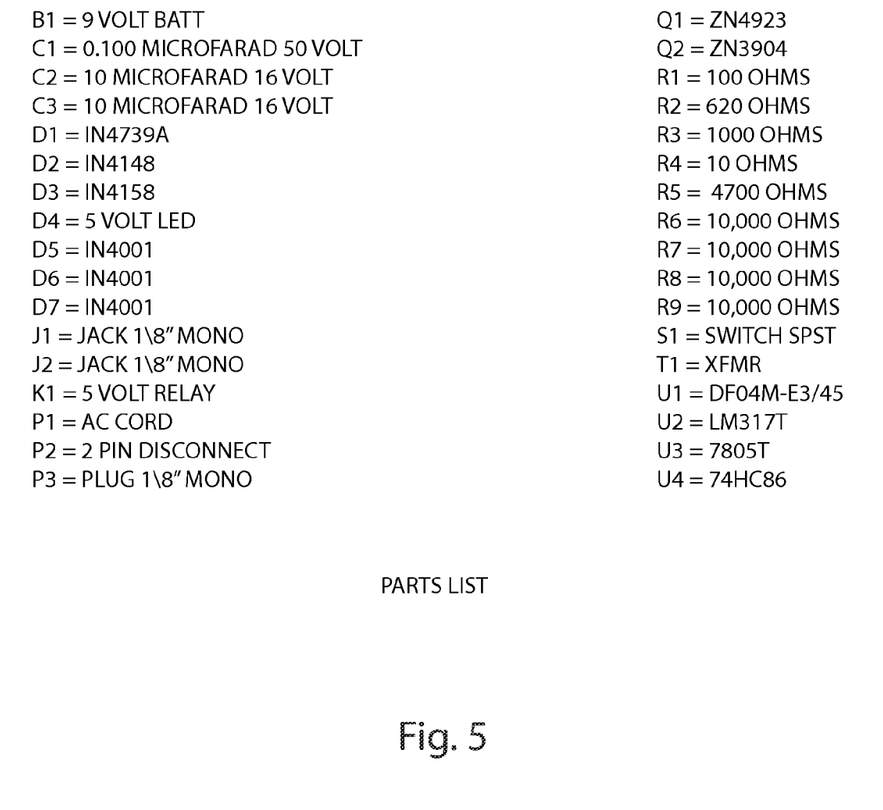

Referring finally to FIG. 5, a chart depicting the parts list of the electronic components as used with the apparatus 10 is depicted. Said description can be related to circuit designations as provided in FIG. 4 with corresponding representation made to certain specific components in other figures. Exact part numbers and values serve to represent circuit operation and are not intended to limit or exclude other specific parts or values which may work equally as well.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common player in a simple and effortless manner with little or no training. After initial purchase or acquisition of the apparatus 10, it would be installed as indicated in FIG. 1.

The method of installing and utilizing the apparatus 10 may be achieved by performing the following steps: acquiring the apparatus 10; activating the apparatus 10 via plugging in the power cord (P1) 30 into a 120 VAC power outlet 35 or operating the apparatus 10 with the internal battery (B1) 57 and depressing the battery power switch (S1) 60; plugging up to two (2) foot pedals 25 into a respective jack (J1, J2) 45, 50; plugging the output cable (P3) 55 into the drum controller 20; placing each foot upon a foot pedal 25; utilizing either foot pedal 25 to perform an action which pertains to the game being played; deactivating the apparatus 10 via disconnecting the power cord (P1) 30 from the 120 VAC power outlet 35 or depressing the battery power switch (S1) 60; and, utilizing the apparatus 10 as desired.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A dual pedal interface for connecting two drum pedal inputs into a single output for a video game system, comprising:

a first bass drum pedal, comprising a first electrical connection cable;

a second bass drum pedal, comprising a second electrical connection cable;

an adapter in electrical communication with said first and said second connection cable;

an electrical output cable in electrical communication between said adapter and a drum controller input of said video game system;

wherein said first connection cable of said first drum bass pedal provides a first input signal to said adapter;

wherein said second connection cable of said second drum bass pedal provides a second input signal to said adapter;

wherein said adapter is in electrical communication with a power source;

wherein said adapter alters each said first input signal and said second input signal to an output signal;

wherein said output signal is transmitted to said drum controller input of said video game system;

wherein said adapter further comprises an enclosure further comprising:

an internal battery;

a battery power switch in electrical communication with said internal battery mounted on an exterior surface of said enclosure;

a disconnect plug in electrical communication with a power cord electrically connected to said power source, said disconnect plug extending outward from said enclosure;

a first integrated circuit in electrical communication with said disconnect plug;

a second integrated circuit in electrical communication with said first integrated circuit;

a first transistor in electrical communication with said second integrated circuit;

a third integrated circuit in electrical communication with said second integrated circuit and said battery power switch;

an indicating light in electrical communication with said third integrated circuit mounted adjacent to said battery power switch;

a fourth integrated circuit in electrical communication with said third integrated circuit;

a first signal jack in electrical communication between a first electrical connection cable associated with said first drum bass pedal and said fourth integrated circuit, said first signal jack located on an exterior surface of said enclosure;

a second signal jack in electrical communication between a second electrical connection cable associated with said second drum bass pedal and said fourth integrated circuit, said second signal jack located on an exterior surface of said enclosure;
a second transistor in electrical communication with said fourth integrated circuit; and,
a relay in electrical communication between said second transistor and said output cable;
wherein said first integrated circuit converts AC from said power cord to DC;
wherein said second integrated circuit and said first transistor regulates and filters said DC;
wherein said battery power switch disconnects said internal battery from said third integrated circuit;
wherein said first signal jack provides said first input signal to said fourth integrated circuit;
wherein said second signal jack provides said second input signal to said fourth integrated circuit;
wherein said fourth integrated signal transfers said first and said second input signal into said output signal;
wherein said second transistor drives said relay to contact said output cable, thereby transmitting said output signal to said output cable; and,
wherein said first signal jack and said second signal jack each comprise an ⅛ inch mono plug.

2. The dual pedal interface of claim 1, wherein said adapter produces an instantaneous switch closure at an instant of either switch closure from said first or second drum bass pedal, said instantaneous switch closure immediately opens back up again regardless of whether said first or said second drum bass pedal was released; and,
wherein said adapter enables an opposite drum bass pedal to immediately issue a closure command without waiting for a prior drum bass pedal to be released, thereby eliminating collision and cancellation effects associated with combining said switch closures in parallel so a user can generate a greater number of bass drum pedal actuations in a given period of time by using both feet.

3. The dual pedal interface of claim 2, wherein said adapter is adapted for use with a drum controller associated with a video game of a video game system.

4. The dual pedal interface of claim 3, wherein said electrical outlet cable, said first signal jack, and said second signal jack are located on a side wall of said enclosure adjacent to each other.

5. The dual pedal interface of claim 4, wherein said disconnect plug is located opposite said first signal jack, and said second signal jack.

6. The dual pedal interface of claim 5, wherein said battery power switch and said indicating light is located on a top wall of said enclosure.

7. The dual pedal interface of claim 3, wherein said battery power switch and said indicating light is located on a top wall of said enclosure.

8. A dual pedal interface for connecting two drum pedal inputs into a single output for a video game system, comprising:
a drum controller in electrical communication with said video game system, comprising:
a first bass drum pedal, comprising a first electrical connection cable;
a second bass drum pedal, comprising a second electrical connection cable; and,
a drum controller input;
an adapter in electrical communication with said first and second connection cable;
an electrical output cable in electrical communication between said adapter and said drum controller input;
wherein said first connection cable of said first drum bass pedal provides a first input signal to said adapter;
wherein said second connection cable of said second drum bass pedal provides a second input signal to said adapter;
wherein said adapter is in electrical communication with a power source;
wherein said adapter alters each said first input signal and said second input signal to an output signal;
wherein said output signal is transmitted to said drum controller input;
wherein said adapter further comprises an enclosure further comprising:
an internal battery;
a battery power switch in electrical communication with said internal battery mounted on an exterior surface of said enclosure;
a disconnect plug in electrical communication with a power cord electrically connected to said power source, said disconnect plug extending outward from said enclosure;
a first integrated circuit in electrical communication with said disconnect plug;
a second integrated circuit in electrical communication with said first integrated circuit;
a first transistor in electrical communication with said second integrated circuit;
a third integrated circuit in electrical communication with said second integrated circuit and said battery power switch;
an indicating light in electrical communication with said third integrated circuit mounted adjacent to said battery power switch;
a fourth integrated circuit in electrical communication with said third integrated circuit;
a first signal jack in electrical communication between a first electrical connection cable associated with said first drum bass pedal and said fourth integrated circuit, said first signal jack located on an exterior surface of said enclosure;
a second signal jack in electrical communication between a second electrical connection cable associated with said second drum bass pedal and said fourth integrated circuit, said second signal jack located on an exterior surface of said enclosure;
a second transistor in electrical communication with said fourth integrated circuit; and,
a relay in electrical communication between said second transistor and said output cable;
wherein said first integrated circuit converts AC from said power cord to DC;
wherein said second integrated circuit and said first transistor regulates and filters said DC;
wherein said battery power switch disconnects said internal battery from said third integrated circuit;
wherein said first signal jack provides said first input signal to said fourth integrated circuit;
wherein said second signal jack provides said second input signal to said fourth integrated circuit;
wherein said fourth integrated signal transfers said first and said second input signal into said output signal;
wherein said second transistor drives said relay to contact said output cable, thereby transmitting said output signal to said output cable and to said drum controller input;
wherein said first signal jack and said second signal jack each comprise an ⅛ inch mono plug.

9. The dual pedal interface of claim 8, wherein said adapter produces an instantaneous switch closure at an instant of either switch closure from said first or second drum bass pedal, said instantaneous switch closure immediately opens back up again regardless of whether said first or said second drum bass pedal was released; and, wherein said adapter enables an opposite drum bass pedal to immediately issue a closure command without waiting for a prior drum bass pedal to be released, thereby eliminating collision and cancellation effects associated with combining said switch closures in parallel so a user can generate a greater number of bass drum pedal actuations in a given period of time by using both feet.

10. The dual pedal interface of claim 9, wherein said adapter is adapted for use with a video game of a video game system.

11. The dual pedal interface of claim 10, wherein said electrical outlet cable, said first signal jack, and said second signal jack are located on a side wall of said enclosure adjacent to each other.

12. The dual pedal interface of claim 11, wherein said disconnect plug is located opposite said first signal jack, and said second signal jack.

13. The dual pedal interface of claim 10, wherein said battery power switch and said indicating light is located on a top wall of said enclosure.

14. The dual pedal interface of claim 12, wherein said battery power switch and said indicating light is located on a top wall of said enclosure.

\* \* \* \* \*